(12) United States Patent
Rittmann et al.

(10) Patent No.: US 6,387,262 B1
(45) Date of Patent: May 14, 2002

(54) HOLLOW-FIBER MEMBRANE BIOFILM REACTOR FOR AUTOHYDROGENOTROPHIC TREATMENT OF WATER

(75) Inventors: Bruce E. Rittmann, Evanston, IL (US); Kuan-Chun Lee, Kobe (JP)

(73) Assignee: Northwestern University, Evanston, IL (US)

( * ) Notice: Subject to any disclaimer, the term of this patent is extended or adjusted under 35 U.S.C. 154(b) by 0 days.

(21) Appl. No.: 09/587,746

(22) Filed: Jun. 5, 2000

(51) Int. Cl.[7] .............................................. B01D 63/02
(52) U.S. Cl. ........................... 210/321.89; 210/321.79; 210/321.8; 210/321.88; 210/433.1; 210/483; 210/488; 210/489; 210/490; 210/500.23
(58) Field of Search ........................ 210/321.6, 321.78, 210/321.79, 321.8, 433.1, 321.87, 321.88, 321.89, 483, 488, 489, 490, 491, 500.23; 422/45, 47, 48

(56) References Cited

U.S. PATENT DOCUMENTS

| | | | |
|---|---|---|---|
| 4,002,567 A | * 1/1977 | Konno et al. | 210/433.1 |
| 4,181,604 A | 1/1980 | Onishi et al. | |
| 4,746,435 A | 5/1988 | Onishi et al. | 210/615 |
| 4,750,918 A | * 6/1988 | Sirkar | 55/158 |
| 5,194,158 A | * 3/1993 | Matson | 210/651 |
| 5,395,525 A | * 3/1995 | Takano et al. | 210/321.89 |
| 5,403,479 A | * 4/1995 | Smith et al. | 210/321.69 |
| 5,637,224 A | * 6/1997 | Sirkar et al. | 210/644 |
| 6,146,535 A | * 11/2000 | Sutherland | 210/637 |

OTHER PUBLICATIONS

H.T. Chang, B.E. Rittmann, "Comparative Study of Biofilm Kinetics on Different Adsorptive Media", *J. Water Pollution Control Federation*, vol. 60, 1988, pp. 362–368.

D. Dries, J. Liessens, W. Verstraete, P. Stevens, P. de Vos, J. de Ley, "Nitrate Removal from Drinking Water by Means of Hydrogenotrophic Denitrifiers in a Polyurethane Carrier Reactor", *Wat. Supply*, vol. 6, 1988, pp. 181–192.

Z. Feleke, K. Araki, Y. Sakakibara, T. Watanabe, M. Kuroda, "Selective Reduction of Nitrate to Nitrogen Gas in a Biofilm–Electrode Reactor", *Wat. Res.*, vol. 32, No. 9, 1998, pp. 2728–2734.

H. Gros, G. Schnoor, P. Rutten, "Biological Denitrification Process with Hydrogen–Oxidizing Bacteria for Drinking Water Treatment", *Wat. Supply*, vol. 6, 1988, pp. 193–198.

S. Islam, M.T. Suidan, "Electrolytic Denitrification: Long Term Performance and Effect of Current Intensity", *Wat. Res.*, vol. 32, No. 2, 1998, pp. 528–536.

(List continued on next page.)

*Primary Examiner*—John Kim
(74) *Attorney, Agent, or Firm*—Greer, Burns & Crain, Ltd.

(57) ABSTRACT

The reactor includes a hollow fiber membrane bundle. Pressurized hydrogen and water are introduced into a volume containing the fiber bundle. The fibers are free to separate and more independently over most of their length. The fibers have microporous inner and outer layers and a nonporous layer sandwiched between the inner and outer layers and are sealed on one end. Hydrogen is introduced inside the fibers, which are sealed on one end to prevent direct escape of the hydrogen gas. The $H_2$ gas dissolves then diffuses through the nonporous layer. Water is introduced around the fibers, and the biofilm reaction occurs on the outer surface of the fibers. Oxidized contaminants are removed from the water by the biofilm reaction, which consumes $H_2$ gas that diffuses through the membrane. The individual fibers are free, over most of their length, to separate in response to the water flow. This prevents excessive biofilm-to-biofilm contact. A gentle environment results in the tube around the membrane bundle for stable biofilm accumulation without channelization or clogging.

4 Claims, 5 Drawing Sheets

OTHER PUBLICATIONS

M. Kurt, J. Dunn, J.R. Bourne, "Biological Denitrification of Drinking Water using Autotrophic Organisms with $H_2$ in a Fluidized–Bed Biofilm Reactor", *Biotechnol. Bioeng.*, vol. 29, 1987, pp. 493–501.

K.C. Lee, "Autohydrogenotrophic Denitrification of Drinking Water using a Hollow–Fiber Membrane Biofilm Reactor", Ph.D. Dissertation, Department of Civil Engineering, Northwestern University, Evanston, IL, 1999.

M. Pankhania, T. Stephenson, M.J. Semmens, "Hollow Fiber Bioreactor for Wastewater Treatment using Bubbleless Membrane Aeration", *Wat. Res.*, vol. 28, No. 10, 1994, pp. 2233–2236.

B.E. Rittmann, "The Effect of Shear Stress on Biofilm Loss Rate", *Biotechnol. Bioeng.*, vol. 24, 1982, pp. 501–506.

Y. Sakakibara, K. Arraki, T. Tanaka, T. Watanabe, M. Kuroda, "Denitrification and Neutralization with an Electrochemical and Biological Reactor", *Wat. Sci. Tech.*, vol. 30, No. 6, pp. 151–155.

H. Tuisel, E. Heinzle, H. Luttenberger, "Biologische Denitrifikation von trinkwasser mit wasserstoff in einem fließbettreaktor", *GWF Wasser Abwasser*, vol. 130, 1989, pp. 10–13.

\* cited by examiner

HOLLOW-FIBER MEMBRANE BIOFILM REACTOR FOR AUTOHYDROGENOTROPHIC TREATMENT OF WATER

FIELD OF THE INVENTION

The field of the invention is water treatment. The invention is particularly useful in the treatment of drinking water, which often contains oxidized contaminants.

BACKGROUND OF THE INVENTION

Treatment to remove oxidized contaminants is an important step in providing a drinking water supply. Municipal, agricultural and industrial brines, and waste waters must also be treated to remove contaminants before reuse or return to the environment. Nitrate and nitrite are particular common oxidized contaminants that must be removed from drinking water and other waters. Removing nitrate ($NO_3^-$) and nitrite ($NO_2^-$) from drinking water is becoming increasingly important because of the risk posed to human health from their contamination of groundwater and surface water. Nitrite is a direct agent for methemoglobinemia and cancer, while nitrate is converted to nitrite in the human digestive system. Therefore, the USEPA has set maximum contaminant levels (MCLs) of 10 mg $NO_3^-$-N/1 and 1 mg $NO_2^-$-N/1.

Denitrification reduces nitrate and nitrite to nitrogen gas ($N_2$). Drinking water typically has very low concentrations of biodegradable organic materials, i.e., it is "oligotrophic". Reduction of nitrate (or nitrite) therefore requires addition of an organic (heterotrophic denitrification) or inorganic (autotrophic denitrification) electron ($e^-$) donor. In heterotrophic denitrification, ethanol, methanol, and acetate are the most common $e^-$ donor substrates for drinking water.

Hetertrophic denitrification of drinking water has several disadvantages, which originate from the after-process residuals due to overdosing or variation of influent nitrate concentration. The residual effect can be acutely problematic if the $e^-$ donor is harmful. Methanol, for example, has special problems because of its acute toxic effects to humans. In general, organic electron donors are readily biodegradable, and any residual in the water-distribution system promotes excessive microbial growth in the pipelines. The effects of such microbial growth include increased plate counts, foul taste and odor, accelerated pipeline corrosion, and decreased hydraulic capacity of the pipelines. Having residual organic electron donors in the drinking water is called biological instability. Although residuals of inorganic electron donors also would create problems of biological instability, they normally do not persist as a residual. In particular, $H_2$ evolves to the air due to its low water solubility.

In autotrophic denitrification, $H_2$ is also an excellent electron donor choice because of its clean nature and relatively low cost. Denitrification using hydrogen as the electron-donor substrate is called autohydrogenotrophic denitrification, and the $H_2$-oxidizing reaction relies on autotrophs, i.e., bacteria that use an inorganic carbon source. Since the growth rate of autotrophic bacteria is low, good biofilm retention is crucial to prevent the biofilm from washing out from the system.

Previous efforts to conduct autohydrogenotrophic denitrification have used hydrogen gas sparging, either in a separated hydrogen saturation tank or directly to the reactor. See, e.g., Kurt et al. "Biological Denitrification of Drinking Water Using Autotrophic Organisms with $H_2$ in a Fluidized-Bed Biofilm Reactor", Biotechnol Bioeng, 29, 493–501; Tuisel et al. "Biologische Denitrifikation von Trinkwasser mit Wasserstoff in Einem Fließbettreaktor", G W F Wasser Abwasser, 130:10–13; Dries et al. "Nitrate Removal from Drinking Water by Means of Hydrogenotrophic Denitrifiers in a Polyurethane Carrier Reactor", Wat. Supply, 6, 181–192, and Gros et al. "Biological Denitrification Process with Hydrogen-Oxidizing Bacteria for Drinking Water Treatment", Wat. Supply, 6:193–198. $H_2$-gas sparging of the system results in saturation or close to saturation of dissolved $H_2$ (1.6 mg/l at 20° C.) in the water. Therefore, a significant amount of $H_2$ is lost with the effluent stream. This wastes electron donor and might even create an explosive atmosphere under certain conditions.

Thus, there is a need for an improved autohydrogenotrophic water treatment reactor that addresses all or some of the aforementioned drawbacks. It is an object of the invention to provide such an improved reactor.

SUMMARY OF THE INVENTION

These and other needs and objects are met or exceeded by the present autohydrogenotrophic water treatment reactor. The present reactor includes a hollow fiber membrane bundle. The membrane bundle is formed from fibers which have microporous inner and outer layers and a nonporous layer sandwiched between the inner and outer layers. Hydrogen is introduced inside the fibers, which are sealed on one end to prevent direct escape of the hydrogen gas. The $H_2$ gas dissolves then diffuses through the nonporous layer. Water is introduced around the fibers, and the bioflim reaction occurs on the outer surface of the fibers. In the biofilm reaction, oxidized contaminants (such as nitrate and nitrite are reduced to harmless products, while the $H_2$ gas is oxidized. The individual fibers are free, over most of their length, to separate in response to the water flow. This prevents excessive biofilm-to-biofilm contact.

A high liquid-phase hydrogen concentration is not required to achieve good removal efficiency in the present reactor. The pressurized hydrogen supply to the fibers allows easy and precise regulation of the hydrogen-supply rate and the liquid-phase hydrogen concentration to achieve target removals. (Partial removal of $NO_3^-$, for example, is allowed by the USEPA standards (i.e., the effluent concentration of $NO_3^-$ simply needs to be below the standard)). A gentle environment results in the volume around the membrane bundle for stable biofilm accumulation without channelization or clogging.

BRIEF DESCRIPTION OF THE DRAWINGS

Other features, objects and advantages of the invention will be apparent to artisans through reference to the detailed description and the drawings, of which:

FIG. 1c illustrates biofilm formation on a hollow fiber in the reactor of FIG. 1a;

DETAILED DESCRIPTION OF THE PREFERRED EMBODIMENT

The invention is directed to an autohydrogenotrophic reactor for removal of oxidized contaminants from water. The description herein is primarily directed to a prototype that has been tested for denitrification. Artisans will appreciate that the particular method for forming a biofilm using the hollow fiber arrangement of the invention is applicable to removal of other oxidized contaminants, which include, but are not limited to perchlorate, chlorate, bromate, and a range of chlorinated solvents.

Figure 1A:
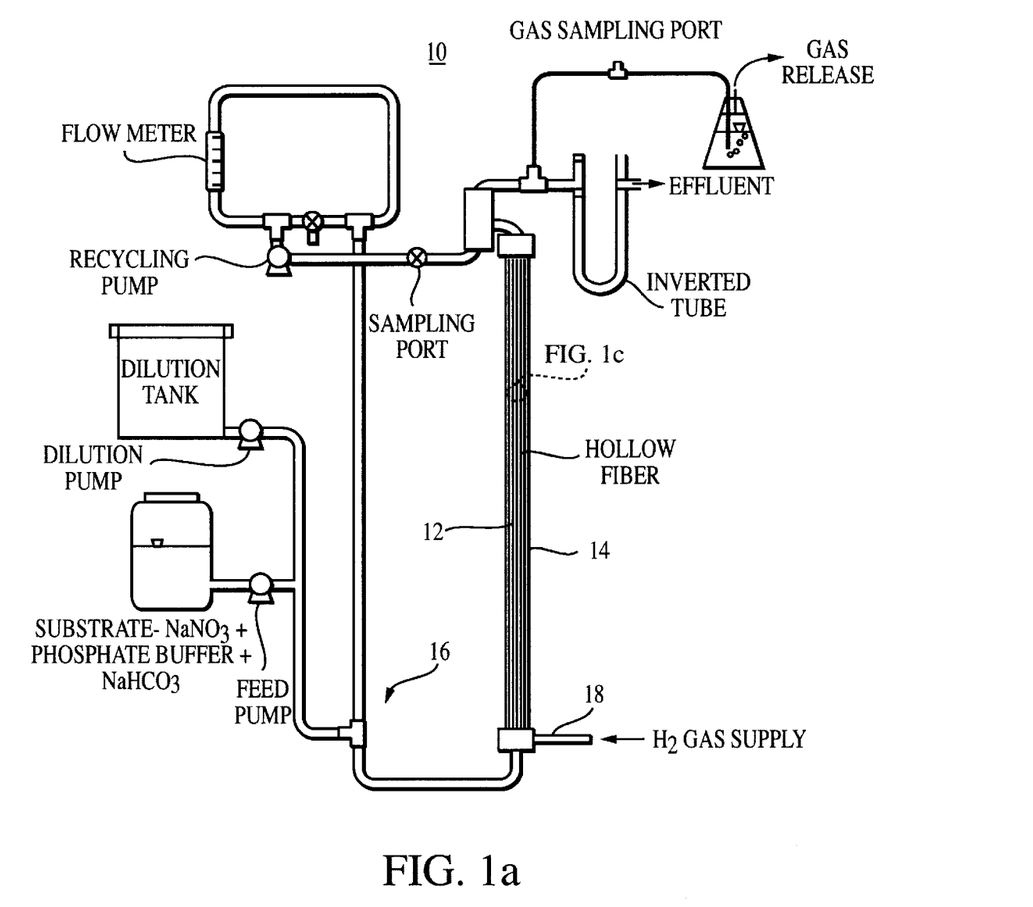
FIG. 1a illustrates a preferred embodiment autohydrogenotrophic water treatment reactor according to the invention.
Figure 1B:
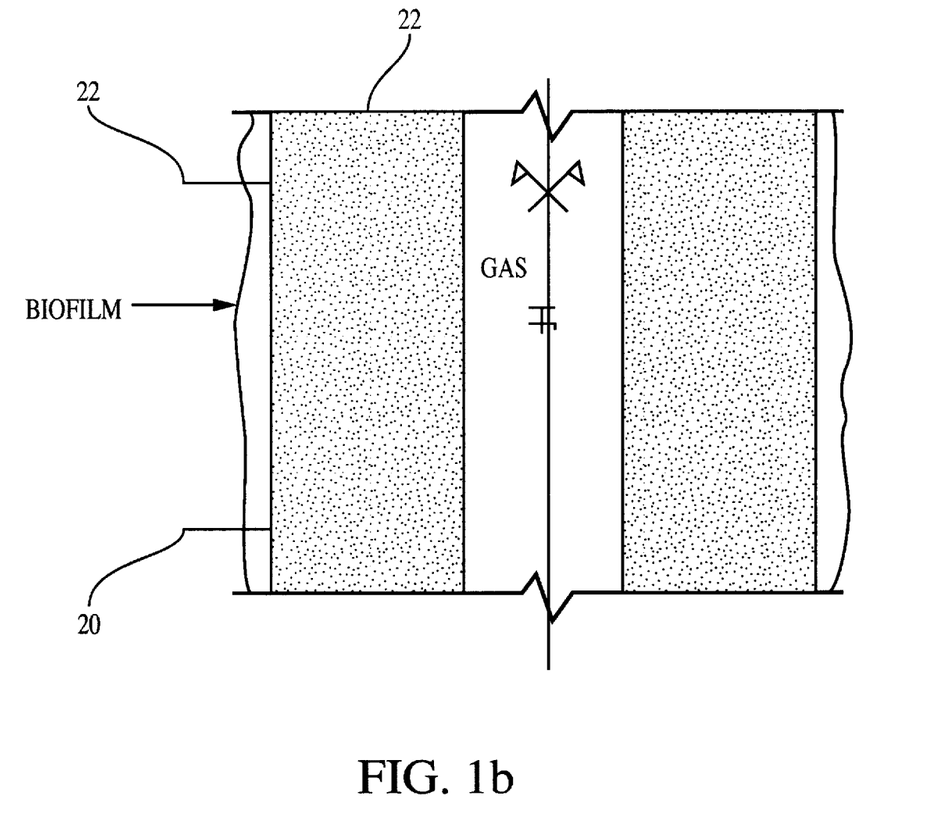
FIG. 1b illustrates a fiber cross section.

A preferred embodiment reactor 10 is shown in FIG. 1. The reactor 10 includes a hollow fiber bundle 12 housed in a tube 14. The tube 14 forms an enclosure that defines a volume to house the hollow fiber bundle. Water to be treated is supplied to the tube 14 from a pipe network, generally designated 16. A controllable $H_2$ gas supply enters through an $H_2$ inlet 18. The hollow fiber bundle 12 is formed from fibers having a nonporous layer 20 sandwiched between two microporous layers 22, as shown in FIG. 1b. The $H_2$ gas is directed inside the fibers, which are potted together at one end of the bundle 12. The opposite ends of the fibers are sealed, but free, allowing the fibers to move independently. The $H_2$ gas is therefore contained under pressure within individual fibers. It dissolves and diffuses through the nonporous layer 22. $H_2$ emerges at the surface of the outer porous layer 20, where biofilm forms through reaction with contaminants. This feature allows creation of a high driving force for gas dissolution without premature bubble formation. Physically and operationally, the fiber bundle arrangement has advantages over prior art methods and reactors, due to the manner in which biofilm forms in the reactor according to the invention.

A prototype has been constructed according to the preferred embodiment shown in FIG. 1. The remaining components in FIG. 1 are unimportant to the invention as any suitable system for water delivery to the enclosure 14 and removal of water and gas may be used. In the prototype, a dilution tank and contaminant substrate were used to control contaminant concentration and a recycle with feed pump controlled water flow in the system. Artisans will appreciate that the fiber bundle arrangement to provide the $H_2$ electron donor is central to the invention, and that other components of the preferred embodiment may be altered to suit particular applications and device scalings.

In the prototype reactor, the hollow-fiber membrane bundle was housed by a 1.5-cm inner diameter PVC tube, and the liquid flow was upward. The hollow fibers were manufactured by Mitsubishi Rayon (Model MHF 200TL) and were a composite fiber. The wall of the fiber was made up of two different materials. The outer and inner layers of the fiber wall were composed of microporous polyethylene. Between the two layers was a 1-micron thick layer of non porous polyurethane. This nonporous layer allowed the creation of a high driving force for gas dissolution without premature bubble formation, as previously mentioned. The hollow fibers were sealed on one end and open to the pressurized hydrogen supply on the other end. The outside or total diameter of one fiber was 0.027 cm, and one 83-fiber bundle provided 750 $cm^2$ of surface area.

Figure 1C:
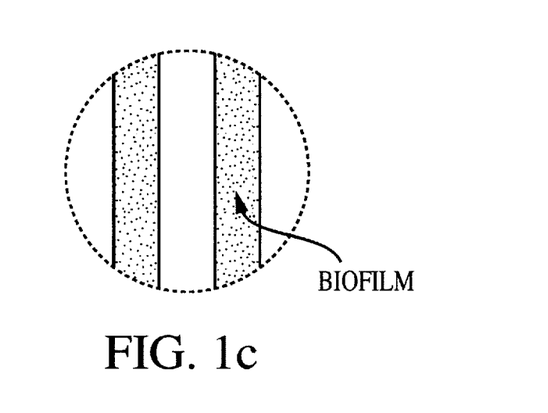

When the liquid flow was turned on in the prototype device, the hollow fibers expanded from the potted end of the hollow-fiber bundle and moved independently. From approximately 10 cm above the potted end, the hollow fibers become evenly distributed throughout the cross-section of the liquid. The total volume of the prototype reactor was 420 ml (including the volume of the recirculation line). The void ratio of the working reactor volume (volume of the PVC tube is 191 $cm^3$; volume of fiber was 5.1 $cm^3$) was 97.3% when the hollow fibers were free of biofilm. This high ratio allowed biofilm to develop on the surface of the fiber without clogging the liquid flow path, as shown in FIG. 1c. It also decreased the frequency of fiber- to-fiber contact and, therefore, reduced the biofilm detachment and the opportunity for fibers to attach to each other due to biofilm growth.

In a conventional autohydrogenotrophic denitrification system, a fixed-film or fluidized-bed biofilm reactor, in which all substrates (such as nitrate and hydrogen) are transferred from the liquid phase into the biofilm, is utilized. The present reactor scheme offers two important advantages over the conventional approach. First, the biofilm loss due to abrasion is much less in the hollow-fiber membrane biofilm reactor than in the fluidized-bed biofilm reactor, because of less biofilm-to-biofilm contact. This improves biofilm accumulation and stability. Second, since the biofilm is on the surface of the hollow fiber, the hydrogen flux goes directly into the biofilm. This makes it possible to attain nearly 100% utilization of $H_2$, which makes the process more economically favorable and safer.

A series of experiments were conducted to document that the present reactor works as anticipated and meets the relevant standards for denitrification of drinking water.
Nitrate and Nitrate-Removals to Below the Regulatory Standards with Low Liquid-Phase Hydrogen Concentration We evaluated the performance of our prototype drinking-water denitrification reactor to demonstrate that nitrate and nitrite removals to below the regulatory standards can be achieved. To initiate operation of the hollow-fiber membrane biofilm reactor, we used *Ralstonia eutropha* ATCC 17697, which is known to denitrify using hydrogen as the electron donor, to inoculate the system for biofilm development. The species was purchased from the American Type Culture Collections, Manassas, Va. The system was operated to steady state for two different conditions of influent $NO_3^-$-N (10 and 12.5 mg N/l) and applied $H_2$ pressure (0.31 and 0.42 atm). Table 1 describes the operation conditions and performance of the system for steady states 1 and 2.

For the first steady-state (SS1) experiment, which had an $H_2$ pressure of 0.31 atm, the system achieved 76% nitrate removal (10 mg $NO_3^-$-N/l to 2.4 mg N/l), and 0.9 mg $NO_2^-$N/l was in the effluent. In the second steady state (SS2), the influent nitrate concentration was 12.5 mg N/l, and the $H_2$ pressure was 0.42 atm. The effluent contained less than 1 mg $NO_3^-$-N/l (92% removal) and 0.7 mg $NO_2^-$-N/l. The effluent $H_2$ concentrations were 0.009 and 0.07 mg/l, respectively. Because the goal of denitrification is to keep the effluent $NO_3^-$ and $NO_2^-$ concentrations below the standards (e.g., 10 mg $NO_3^-$-N/l and 1 mg $NO_2^-$-N/l by USEPA), the partial removals seen in both steady states meet the first performance criterion. These results clearly demonstrate how increasing the $H_2$ gas pressure (from 0.31 to 0.42 atm) substantially increased nitrate removal without creating a high effluent $H_2$ concentration.

TABLE 1

OPERATION CONDITIONS AND PERFORMANCE OF THE SYSTEM FOR STEADY STATES 1 AND 2

| PARAMETERS | SS1 | SS2 |
|---|---|---|
| Influent nitrate concentration, mg $NO_3$—N/l | 10 | 12.5 |
| Influent flow rate, ml/min | 10 | 10 |
| Hydraulic retention time, min | 42 | 42 |
| Recycling flow rate, ml/min | 1750 | 1750 |
| Influent pH | 7.0 | 7.0 |
| Applied $H_2$ pressure, atm | 0.31 | 0.42 |
| Effluent nitrate concentration, mg $NO_3$—N/l | 2.44 | 0.95 |
| Effluent nitrite concentration, mg $NO_3$—N/l | 0.9 | 0.74 |
| Effluent $H_2$ concentration, mg $H_2$/l | 0.009 | 0.07 |
| Headspace $H_2$ concentration, % | 0.8 | 3.6 |
| Average biofilm surface accumulation, mg cell/cm$^2$ | 0.55 | 0.9 |
| Average biofilm thickness, μm | 110 | 179 |
| Total biofilm surface area, cm$^2$ | 1340 | 1660 |
| Specific biofilm surface area, m$^{-1}$ | 324 | 403 |
| Effluent biomass concentration, mg cells/l | 0.89 | 1.53 |
| Biofilm detachment rate, mg cells/cm$^2$/day | 0.0094 | 0.013 |
| Specific biofilm detachment rate, day$^{-1}$ | 0.017 | 0.015 |

The higher removals of nitrate and $H_2$ increased the biofilm surface accumulation and thickness, which, in turn, increased the diameter of the biofilm's outer surface and the total biofilm surface area for nitrate to diffuse into the biofilm. The surface nitrate fluxes, which were computed as the mass-per-time rate of nitrate removal normalized to the biofilm surface area, were 0.08 and 0.1 mg $NO_3^-$-N/cm$^2$ of biofilm surface area/day for the two steady states, respectively. These values are higher than those found in most of the existing autohydrogenotrophic denitritication studies. As the flux increased, the average biofilm thickness increased from 110 μm to 179 μm. This increase of biofilm thickness expanded the total biofilm surface area from 1,340 to 1,660 cm$^2$, making the specific biofilm surface area almost 400 m$^{-1}$ for the second steady state.

The high flux of nitrate N did not require a high liquid $H_2$ concentration because of the "counter-diffusion" of $H_2$ and nitrate, i.e., nitrate and hydrogen go into the biofilm from opposing directions. Nitrate diffuses into the biofilm through a liquid-diffusion layer from the bulk-liquid side of the biofilm, while hydrogen is delivered directly from the fiber side of the biofilm. Unoxidized hydrogen diffuses out of the biofilm through the diffusion layer into the bulk liquid. Previous studies (Kurt et al., 1987; Tuisel et al., Dries et al., 1988; Gros et al., 1988) required about 1 mg $H_2$/l when a separate hydrogen absorption tank or direct bubbling in the reactor was used to transfer hydrogen into the liquid phase. In this study, the % unutilized hydrogen—i.e., the ratio of $H_2$ leaving in the effluent divided by the $H_2$ used for nitrate reduction, nitrite reduction, and loss to the effluent—was computed by Equation 1.

$$100\% \left( \frac{S_{e,H_2}}{1/7(S_{in,nitrate-N} - S_{e,nitrite-N}) + 3/14(S_{in,nitrate-N} - S_{e,nitrate-N} - S_{e,nitrite-N}) + S_{e,H_2}} \right) \quad (1)$$

where $S_{e,H_2}$ is hydrogen concentration in the effluent (mg $H_2$/l), $S_{in,nitrate-N}$ and $S_{e,nitrate-N}$ are the influent and effluent nitrate nitrogen concentrations (mg N/l), and $S_{e,nitrite-N}$ is the effluent nitrite nitrogen concentration (mg N/l). For steady states 1 and 2, the computed % unutilized $H_2$ equaled 0.1 and 1.4%, respectively. Therefore, more than 98.5% of the hydrogen transferred from the hollow-fiber membrane was utilized for denitrification. In addition, the $H_2$ contents in the headspace for the two steady states were 0.8 and 3.6%, respectively. These results confirm that using hydrogen in a hollow-fiber biofilm reactor for denitrification had very high $H_2$-utilization efficiency and could avoid an explosive hazard, as the explosive range for hydrogen is 4 to 74.5% in air.

Minimum Biofilm Detachment Rate for Excellent Biomass Accumulation

The biofilm detachment rates, which were calculated as the mass rate of the suspended-phase biomass flowing out of the system in the effluent normalized to biofilm surface area, were 6.9×10$^{-3}$ and 9.6×10$^{-3}$ mg cells/cm$^2$ of biofilm surface area/day, respectively. Therefore, as the substrate loading increased, the biofilm detachment rate increased. The specific biofilm detachment rates, which were calculated as the biofilm loss rate per unit biofilm surface area divided by the biofilm mass per unit surface area, were similar at 0.016 and 0.014 day$^{-1}$. These values are very small, approximately one order of magnitude lower than a typical fluidized-bed biofilm reactor. The biofilm detachment rate, which is controlled by abrasion and liquid shearing force, was low due to the small frequency of fiber-to-fiber contact inside the reactor and the small head loss through the membrane module. The slow-growing autohydrogenotrophic denitrifiers benefited from the low detachment rate and accumulated well in the system.

Precise Control of Hydrogen-Supply Rate for Target Nitrate Removal Efficiency

To demonstrate that the nitrate removal efficiency can be easily controlled by hydrogen pressure, we performed many short-term tests by varying influent nitrate concentrations and hydrogen pressures after the system has reached steady state with a given nitrate loading and $H_2$ pressure. The short-term tests were conducted with three hydrogen pressures, each of which had five different influent nitrate concentrations, i.e., 5, 7.5, 10, 12.5, and 15 mg $NO_3^-$-N/l to facilitate 5 different mass-per-biofilm-surface-area-per-time nitrate loadings. For steady state 1, the three hydrogen pressures were 0.2, 0.31, 0.45 atm, while they were 0.32, 0.42, and 0.56 atm for steady state 2. For each short-term test, the change of system conditions lasted for three hours before samples were taken. With a liquid retention time of 42 minutes in the hollow-fiber membrane biofilm reactor, three hours (more than 4 liquid retention times) was long enough for the system to reach a pseudo-steady state, which is defined as a condition in which the liquid concentrations reached a stable state, while the biofilm accumulation was not changed significantly from the true steady state, due to the short duration of the change.

Figure 2A:
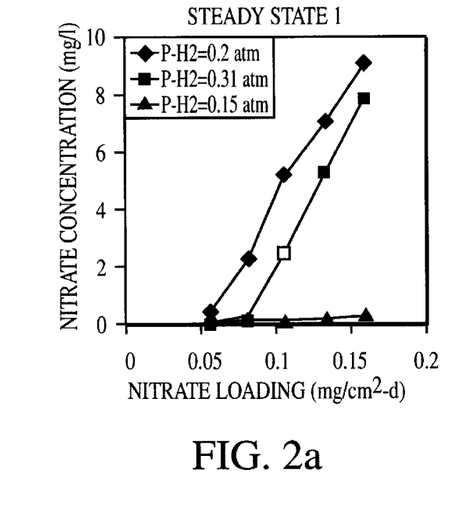
FIGS. 2a and 2b illustrate nitrate concentration at different nitrate loadings in separate steady states obtained in a prototype reactor of the invention.
Figure 2B:
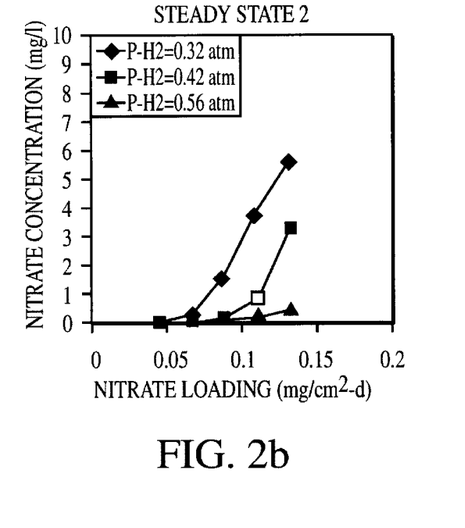

FIGS. 2a and 2b show the bulk-liquid nitrate concentrations at different nitrate loadings during the two steady states and their short-term experiments. Generally, nitrate concentration increased as a result of increasing nitrate loading or decreasing hydrogen pressure. When hydrogen pressure was low (as seen for $P_{H2}$=0.2 atm and the last four points for 0.31 atm in SSI, and the last four points for $P_{H2}$=0.32 atm in SS2), the nitrate concentration increased dramatically and linearly as nitrate loading increased. This indicates that the biofilm reactor has reached its capacity for nitrate removal for the given hydrogen supply.

Figure 3A:
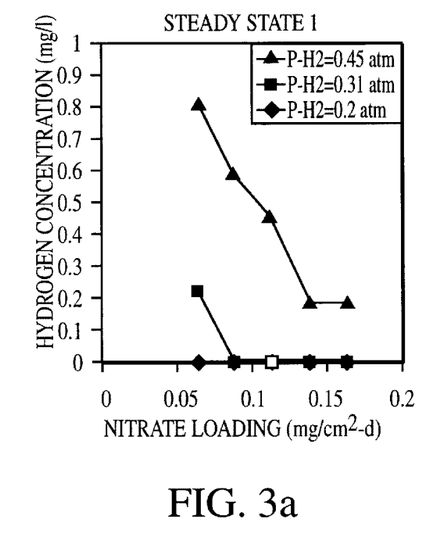
FIGS. 3a and 3b illustrate hydrogen concentration at different nitrate loadings in separate steady states obtained in a prototype reactor of the invention.
Figure 3B:
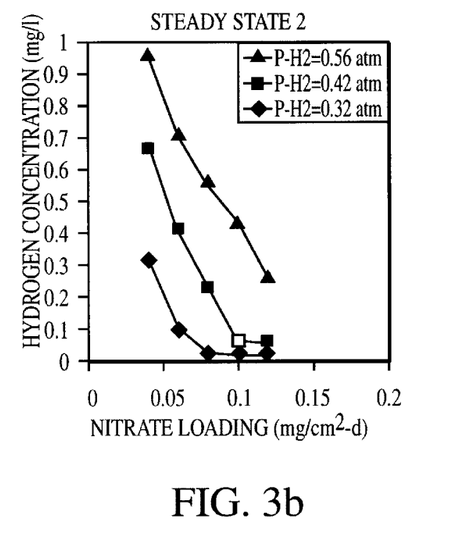
Figure 4A:
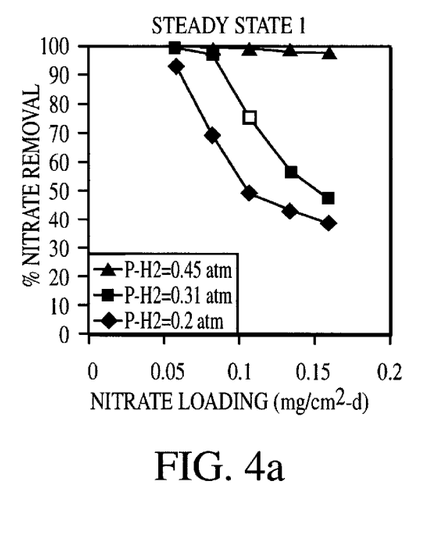
FIGS. 4a and 4b illustrate percentage nitrate removal at different nitrate loadings in separate steady states obtained in a prototype reactor of the invention.
Figure 4B:
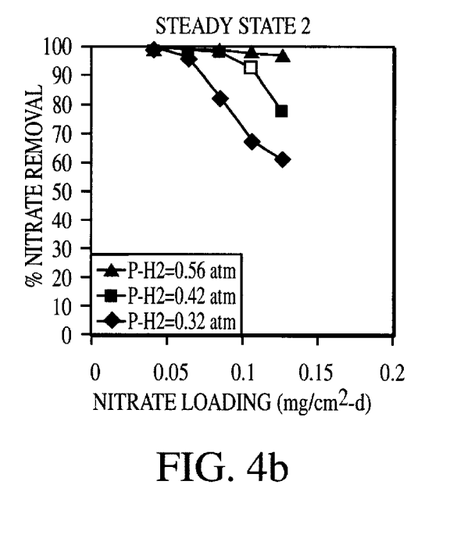
Figure 5A:
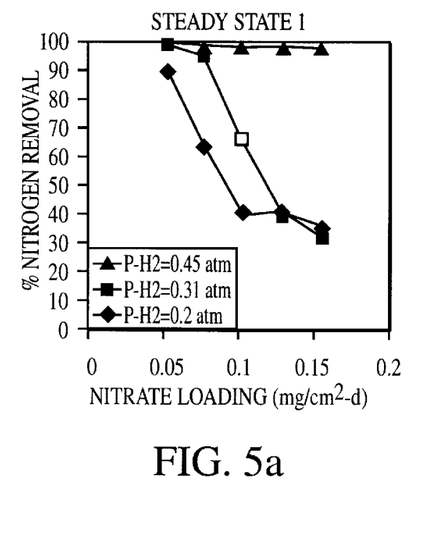
FIGS. 5a and 5b illustrate percentage nitrogen removal at different nitrate loadings in separate steady states obtained in a prototype reactor of the invention.
Figure 5B:
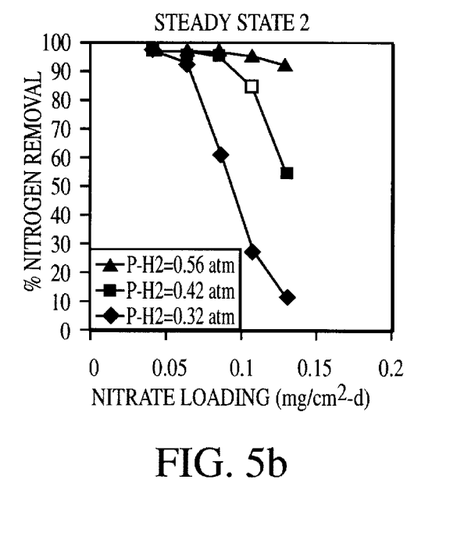

FIGS. 3a and 3b show the hydrogen concentration for the different nitrate loadings. In general, an increasing applied hydrogen pressure at a given nitrate loading caused an increasing hydrogen concentration. When the applied hydrogen pressure was fixed, the bulk-liquid hydrogen concentration decreased as nitrate loading increased and then leveled off. The leveling of hydrogen concentration marks the transition from nitrate limitation to hydrogen limitation. When the supply of hydrogen was very low, as seen for $P_{H2}$=0.2 atm for SS1, the hydrogen concentration was low and constant during all of the short-term experiments.

We computed two types of percent nitrogen removals to describe the nitrogen removal efficiency, as shown in Equations 2 and 3. The percent nitrate removal is computed based on the amount of nitrate removed and the amount of nitrate in the influent. The percent nitrogen removal is based on the amount of total nitrogen leaving the reactor and amount of nitrate in the influent.

$$\% \ NO_3^- - N \ removal = 100\% \frac{S_{in,nitrate-N} - S_{e,nitrate-N}}{S_{in,nitrate-N}} \quad (2)$$

$$\%N \ removal = 100\% \frac{S_{in,nitrate-N} - (S_{e,nitrate-N} + S_{e,nitrite-N})}{S_{in,nitrate-N}} \quad (3)$$

where $S_{in,nitrate-N}$ and $S_{e,nitrate-N}$ are $NO^{31}_3$-N concentrations in the influent and effluent, respectively (mg N/l), and $S_{e,nitrite-N}$ is $NO_2^-$-N concentrations in the effluent (mg N/l).

FIGS. 4a, 4b, 5a, and 5b show the percent nitrate and percent nitrogen removals at different nitrate loadings. The nitrate and total nitrogen removal efficiencies increased when the applied hydrogen pressure increased, especially when the nitrate loading was high. Likewise, dramatic decreases in nitrate and nitrogen removal efficiencies were observed for increasing nitrate loading when the hydrogen pressure was low. For example, when $P_{H2}$ was equal to 0.2 and 0.31 atm in SS1, increases of nitrate loading from 0.054 to 0.16 mg N/cm²-d decreased the nitrate removal efficiency from 92 to 39% and 97 to 48%, respectively. The same trend was observed for percentage nitrogen removal.

Figure 6A:
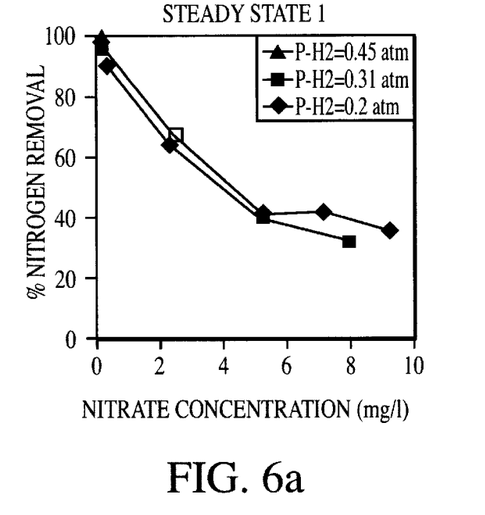
FIGS. 6a and 6b illustrate percentage nitrogen removal at different nitrate concentrations in separate steady states obtained in a prototype reactor of the invention.
Figure 6B:
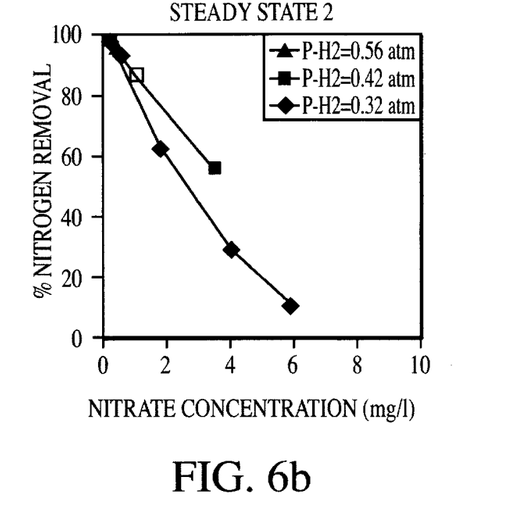
Figure 7A:
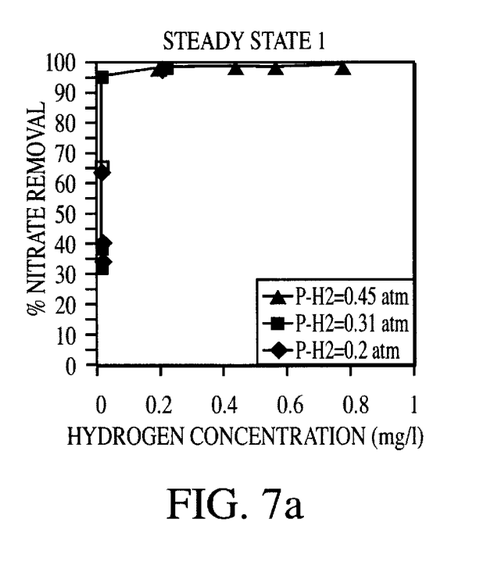
FIGS. 7a and 7b illustrate percentage nitrogen removal at different hydrogen concentrations in separate steady states obtained in a prototype reactor of the invention.
Figure 7B:
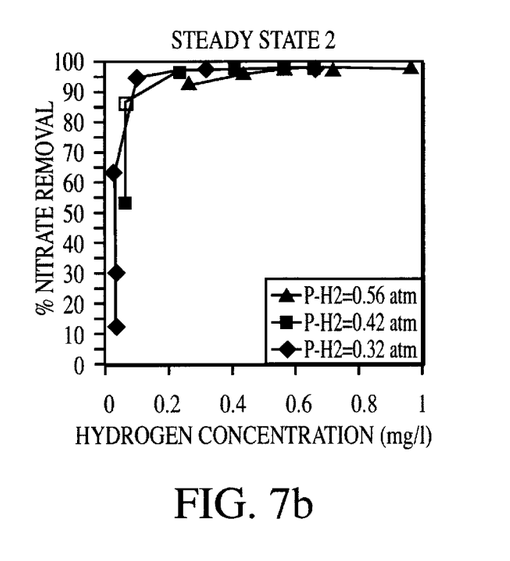

FIGS. 6a, 6b, 6c, and 6d show the percentage nitrogen removal vs. nitrate and hydrogen concentrations. In general, at a fixed hydrogen pressure, the percentage nitrogen removal decreased nearly linearly as the bulk-liquid nitrate concentration increased, as seen in FIGS. 6a and 6b. Conversely, the percentage nitrogen removal increased dramatically with small increases in hydrogen concentration when the hydrogen concentration was low, as seen in FIGS. 7a and 7b. For example, in steady state 1, the percentage nitrogen removal increased from 32.5 to 95% when the $H_2$ concentration only increased from 0.006 to 0.01 mg/l.

Collectively, the data obtained from the prototype reactor of the invention indicates that the invention can efficiently remove nitrate and nitrite to below the regulatory standards with effluent hydrogen concentration orders of magnitude lower than those in previously reported studies. The low frequency of biofilm-to-biofilm contact facilitated excellent biofilm accumulation. The nitrate and nitrogen removal efficiencies were easily controlled by the hydrogen pressure.

The invention can be applied to autohydrogenotrophic removal of oxidized contaminants from drinking water supplies, including surface water and ground water. The invention may be installed, for example, within an existing treatment system before the filtration and disinfection processes. The invention may also be used to remove oxidized contaminants from brines and waste waters (municipal, agricultural, or industrial) in which electron donors are insufficient.

These and other applications and implementations will be apparent to artisans. The particular use of hollow fibers in the invention provides a gentle environment for stable biofilm accumulation, and the ability to selectively control contaminant removal while achieving low hydrogen donor concentrations in the liquid.

While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. An autohydrogenotrophic water denitrification reactor comprising:

an enclosure defining a volume;

a hollow fiber membrane bundle contained in said volume, fibers in said hollow fiber membrane bundle being formed from microporous inner and outer layers and a nonporous layer sandwiched between said inner and outer layers, the fibers being sealed at one end and open at an opposite end;

a pressurized hydrogen inlet to said enclosure;

said hydrogen inlet in fluid communication with open ends of said fibers;

a hydrogen supply supplying hydrogen to said hydrogen inlet;

a water inlet to said enclosure;

a water supply supplying water to said water inlet; and a water and gas outlet from said enclosure.

2. The reactor according to claim 1, wherein said fibers in said hollow fiber membrane bundle are free at said one end and held together at said opposite end.

3. The reactor according to claim 1, wherein said microporous inner and outer layers comprise microporous polyethylene and said nonporous layer comprises nonporous polyurethane.

4. The reactor according to claim 1 wherein said nonporous layer has a thickness on an order of magnitude of one micron.

* * * * *